3,520,712
PROCESS OF APPLYING CRYSTALS TO ARTIFICIAL FLOWERS
Eileen Bishop, Sunnyside, Wash., assignor of fifty percent to Ellen Phinney, Sunnyside, Wash.
Filed Aug. 21, 1967, Ser. No. 661,864
Int. Cl. B44d 1/14; B44c 1/06, 5/06
U.S. Cl. 117—26  2 Claims

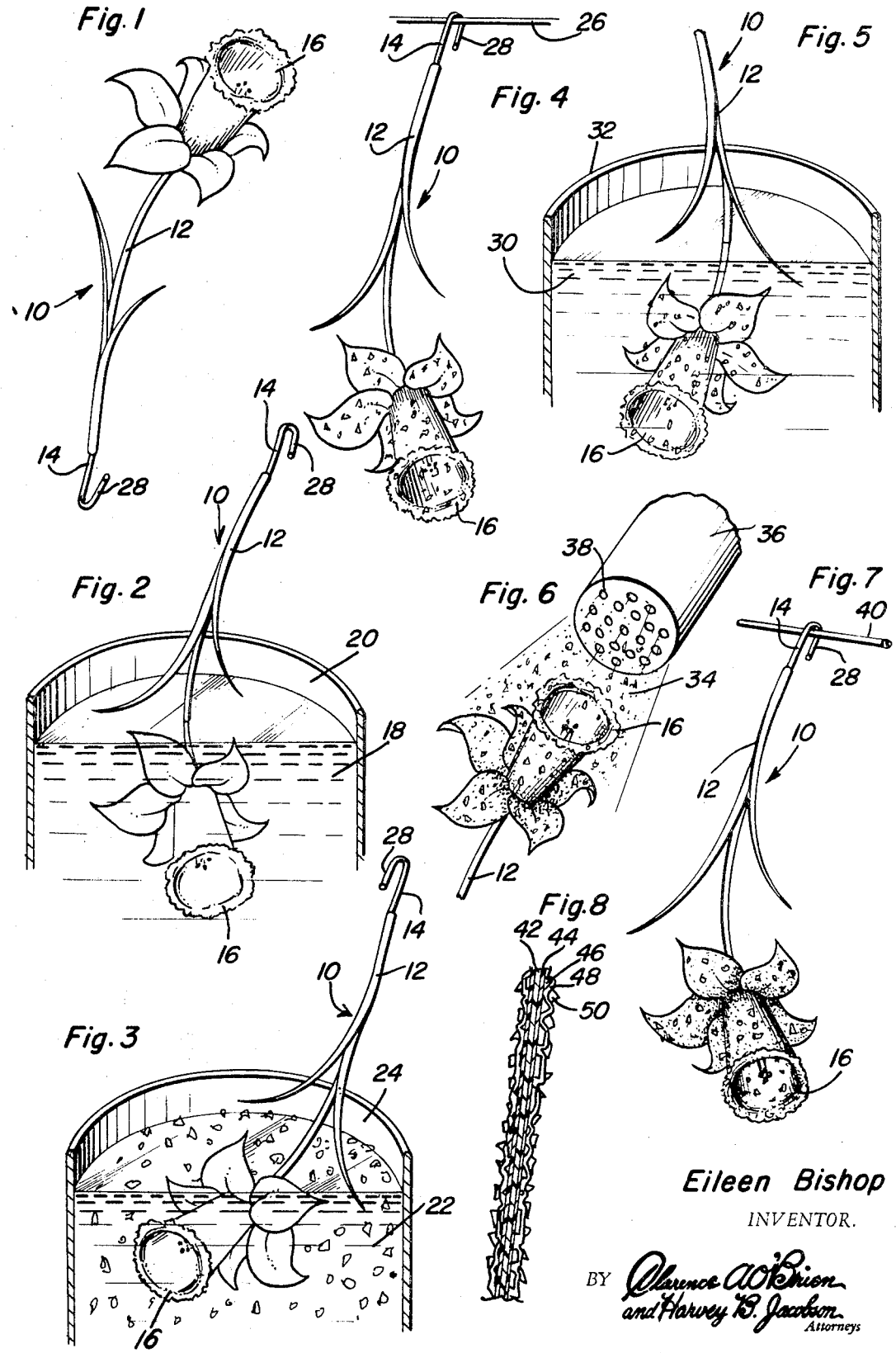

ABSTRACT OF THE DISCLOSURE

An artificial flower, tree or other art object or the like which has applied to the external surface thereof a layer or layers of crystals to provide an iridescent effect and a process for applying such crystals to such art objects. The process includes the steps of dipping a conventional and commercially available plastic flower or other art object into a reservoir of resin and then dipping the coated flower or art object into plastic crystals, such as polystyrene resin thermoplastic granules marketed by Dow Chemical Co. of Midland, Mich. under the trade mark "Styron," and allowing the resin to dry. Thereafter, the flower or art object having the crystals thereon is again dipped into a reservoir of resin for a second coat and crystals are then sprinkled onto the second coat of resin and the flower or art object is then permitted to dry thereby enhancing the appearance characteristics of artificial flowers, trees or the like.

---

The present invention generally relates to the construction of an ornamental art object such as a conventional and commercially available plastic flower, tree or the like with a novel process for applying crystals to the surface of such an object to produce an iridescent effect inasmuch as the crystals will serve to reflect light rays in a random manner An object of the present invention is to provide a process for applying a crystal coating to an artificial flower or other art object in which an initial layer of bonding agent such as a settable resin is applied to the object after which a first layer of crystals is provided on the resin layer with the resin layer being hardened or set by drying. Thereafter, a second layer of resin material is applied to the crystallized object and a second layer of crystals is applied to the second layer of resin which is then allowed to harden or set by drying thus securely mounting the crystals in place and by employing transparent resins, the color of the original object will be visible along with the crystals in both layers thereof to produce an iridescent effect.

A further object of the present invention is to provide a process in accordance with the preceding object in which the resin coatings are applied by a dipping operation, the first layer of crystals is applied by a dipping operation and a second layer of crystals is applied by sprinkling crystals onto the resin coated object.

Still another object of the present invention is to provide a process in accordance with the preceding objects which is simple in operation, relatively inexpensive and provides a desirable improvement in the appearance characteristics of an object.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 illustrates a plastic flower of a conventional and commercially available type prior to its being subjected to the process of the present invention;

FIG. 2 is a perspective view illustrating the plastic flower being dipped into a reservoir of resin;

FIG. 3 is a perspective view illustrating the next step in the process in which the resin coated plastic flower is dipped into a supply of crystals;

FIG. 4 is a perspective view of the step in the process illustrating the drying period for the crystal coated flower;

FIG. 5 is a perspective view of the next step in the process illustrating the crystal covered flower being dipped into a reservoir of resin;

FIG. 6 is a perspective view of the next step in the process illustrating a second layer of crystals being sprinkled onto the resin coated flower;

FIG. 7 is a perspective view of the last step in the process illustrating the second drying operation; and FIG. 8 is an enlarged sectional view of a portion of the plastic flower illustrating the resin and crystal layers applied thereto.

Referring now specifically to the drawings, the numeral 10 generally designates a plastic flower having the usual stem 12 provided with an interior bendable wire 14 and the usual bloom 16 which may be of various shapes and configurations depending upon the type of flower involved. As is well known, plastic flowers of this type take many shapes and configurations and closely simulate actual flowers in size, appearance and the like.

In following the process of the present invention, the plastic flower 10 is dipped into a supply of resin 18 disposed in a suitable container such as a bucket 20 or the like to a depth to at least cover the bloom or petals 16 as illustrated in FIG. 2. The resin 18 is of a quick drying type which will harden and set-up rather rapidly in normal room temperature. The resin coated flower 10 is then dipped into a supply of "Styron" crystals 22 which are disposed in a suitable container such as a bucket 24. Thereafter, the flower 10 coated with the resin and crystals is dried by conveniently hanging the coated flower on a supporting line 26 by virtue of providing a hook 28 on the terminal end of the bendable wire 14 as illustrated in FIG. 4. The hook 28 otherwise serves as a handle for manipulating the flower during the initial coating operation. It normally will take several hours of time to have the initial coating of the resin material to completely dry and set-up.

After the initial resin coating and crystals thereon have dried and completely set up, the plastic flower 10 is then immersed or dipped into a second supply of resin 30 contained in a bucket 32 or the like or the same supply of resin 18 may be employed again. After the second coating or resin has been applied to the flower, it is withdrawn therefrom and crystals 34 are sprinkled thereon by employing a suitable sprinkler apparatus 36 preferably in the form of a container having a plurality of openings 38 in the end thereof to enable the crystals 34 to be effectively sprinkled onto the second coating of resin material. Thereafter, the plastic flower with the two coatings of resin and two coatings of crystals is hung on a supporting line 40 for a second drying operation in the same manner as illustrated in FIG. 4 so that after several hours of drying, the plastic flower 10 will be ready for use with the two coatings of resin and crystal material producing an iridescent effect and enhancing the appearance characteristics of the flower.

FIG. 8 illustrates an enlarged view of the coated flower with the plastic material forming the flower being designated by numeral 42. On both sides of the plastic flower layer is a layer of resin material 44 having a first layer of crystals 46 embedded therein. Overlying the first resin layer 44 and the layer of crystals 46 is a second layer of resin material 48 having a second layer of crystals 50 embedded therein whereby the layers 44 and 48 of resin material serve to securely retain the crystals 50 and 46 in position on the plastic panel 42. The resin materials are transparent to enable the color of the plastic panel to be observed therethrough and the crystals may also be transparent or provided with any suitable color for either altering the color characteristics of the flower slightly or producing an iridescent effect due to the light reflecting qualities of the crystals. As illustrated in FIGS. 4 and 7, the plastic flower should be supported in an inverted position during the drying operation to eliminate the possibility of any of the resin material running down the stem.

Other objects may be coated by employing the process of the present invention such as small artificial trees and other art objects all of which are enhanced in appearance by coating the object with resin material and crystals. The crystals employed are commercially available polystyrene crystals and the resin employed is a commercially available transparent resin material which is hardenable or settable when air dried. In some instances, a colored resin may be employed to enhance the appearance of the coated flower. The exact drying time in each of the drying operations will vary depending upon the atmospheric conditions encountered. Normally, several hours of drying time is required when the coated flowers are hung in a normal ambient atmosphere such as normal room temperature and normal room humidity conditions.

In lieu of the second dipping process illustrated in FIG. 5, a spray process may be employed in the second and any subsequent resin coating step. A conventional compressed air operating spray gun may be employed for spraying of resin onto the art object which has already been provided with a first coating applied by the dipping process as illustrated in FIG. 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. The process for applying a multi-layer decorative coating to an art object consisting of the steps of dipping an object into an air drying liquid transparent resin for completely coating the surface of the art object with resin, dipping the resin coated object prior to setting of the resin into a supply of granular polystyrene crystals whereby the coating of resin will adhere crystals to the object throughout the resin coated surface area thereof in a uniform manner, allowing the object to dry thereby setting and hardening the resin and securing the crystals in place on the art object, dipping the coated art object into an air drying liquid transparent resin for completely coating the art object with a second layer of resin, sprinkling granular polystyrene crystals onto the second layer of resin prior to setting and hardening thereof, and drying the resin for securing the sprinkled-on crystals in place.

2. The process as defined in claim 1 in which the art object provided with a crystallized coating is a plastic flower having the plastic bloom and stem provided with a central wire, having a hook on the end of the stem remote from the bloom to support the flower in inverted position while drying.

References Cited

UNITED STATES PATENTS

| 252,245 | 1/1882 | Newell | 117—33 |
| 1,639,863 | 8/1927 | Sinclair et al. | 117—33 |
| 1,765,981 | 6/1930 | Kathe | 117—25 |
| 1,979,084 | 10/1934 | Sweeney | 117—16 |
| 2,750,300 | 6/1956 | Kukoff | 117—33 |
| 2,761,177 | 9/1956 | Walters | 117—21 |
| 2,763,079 | 9/1956 | Slovitt | 117—16 |
| 2,783,568 | 3/1957 | Robinson | 117—33 |
| 3,006,780 | 10/1961 | Shaffer | 117—33 |
| 3,188,227 | 6/1965 | Vodicka et al. | 117—33 |
| 3,377,184 | 4/1968 | Kukoff | 117—33 |

FOREIGN PATENTS 1,817  3/1895  Great Britain.

WILLIAM D. MARTIN, Primary Examiner

R. M. SPEER, Assistant Examiner

U.S. Cl. X.R.

117—16, 33